United States Patent
Grigorov et al.

(10) Patent No.: US 10,248,283 B2
(45) Date of Patent: Apr. 2, 2019

(54) CONTEXTUAL GUI-STYLE INTERACTION FOR TEXTUAL COMMANDS

(71) Applicant: VMware, Inc., Palo Alto, CA (US)

(72) Inventors: Danail Grigorov, Sofia (BG); Martin Marinov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 563 days.

(21) Appl. No.: 14/828,523

(22) Filed: Aug. 18, 2015

(65) Prior Publication Data

US 2017/0052671 A1    Feb. 23, 2017

(51) Int. Cl.
G06F 3/0481    (2013.01)
G06F 3/0482    (2013.01)
G06F 3/0484    (2013.01)
G06F 9/451    (2018.01)
G06F 9/44    (2018.01)

(52) U.S. Cl.
CPC ........ G06F 3/04812 (2013.01); G06F 3/0482 (2013.01); G06F 3/04842 (2013.01); G06F 9/4443 (2013.01); G06F 9/451 (2018.02)

(58) Field of Classification Search
CPC ...... G06F 3/048; G06F 3/0481; G06F 3/0482; G06F 3/0484; G06F 3/04812; G06F 3/04842

See application file for complete search history.

(56) References Cited

U.S. PATENT DOCUMENTS

| | | | | |
|---|---|---|---|---|
| 8,244,780 B1 * | 8/2012 | Narayanan | ........ | G06F 17/30345 707/804 |
| 2011/0283204 A1 * | 11/2011 | Jacobs | ...................... | G06F 8/33 715/762 |
| 2012/0150939 A1 * | 6/2012 | Zaifman | ............. | G06F 9/45512 709/203 |
| 2016/0342665 A1 * | 11/2016 | Lane | ................. | G06F 17/30557 |

* cited by examiner

*Primary Examiner* — Xiomara L Bautista
(74) *Attorney, Agent, or Firm* — Su IP Consulting

(57) ABSTRACT

A method for a processor to provide a user interface to manage entities in a software system domain includes, in response to receiving a command line, executing the command, receiving the output of the command where the output include metadata of an entity in the software system domain, preserving the metadata, converting the output to a text item, displaying the converted text item in the user interface, and associating the text item in the user interface with its metadata. The method further includes, in response to receiving a user interaction with the displayed text item from a pointing device or a keyboard, retrieving the metadata associated with the text item in the user interface and performing, based on the metadata associated with the text item, an entity-specific action for the selected item, such as generating an entity-specific contextual menu or invoking a command on the entity.

12 Claims, 4 Drawing Sheets

US 10,248,283 B2

CONTEXTUAL GUI-STYLE INTERACTION FOR TEXTUAL COMMANDS

BACKGROUND

Sufficiently complex software systems typically offer two distinct kinds of interfaces for managing entities within the system domain: (1) a graphical user interface (GUI) management tool emphasizing ease-of-use and (2) a command-line interface (CLI) based on textual commands suited for scripting and automation.

DETAILED DESCRIPTION

Figure 1:
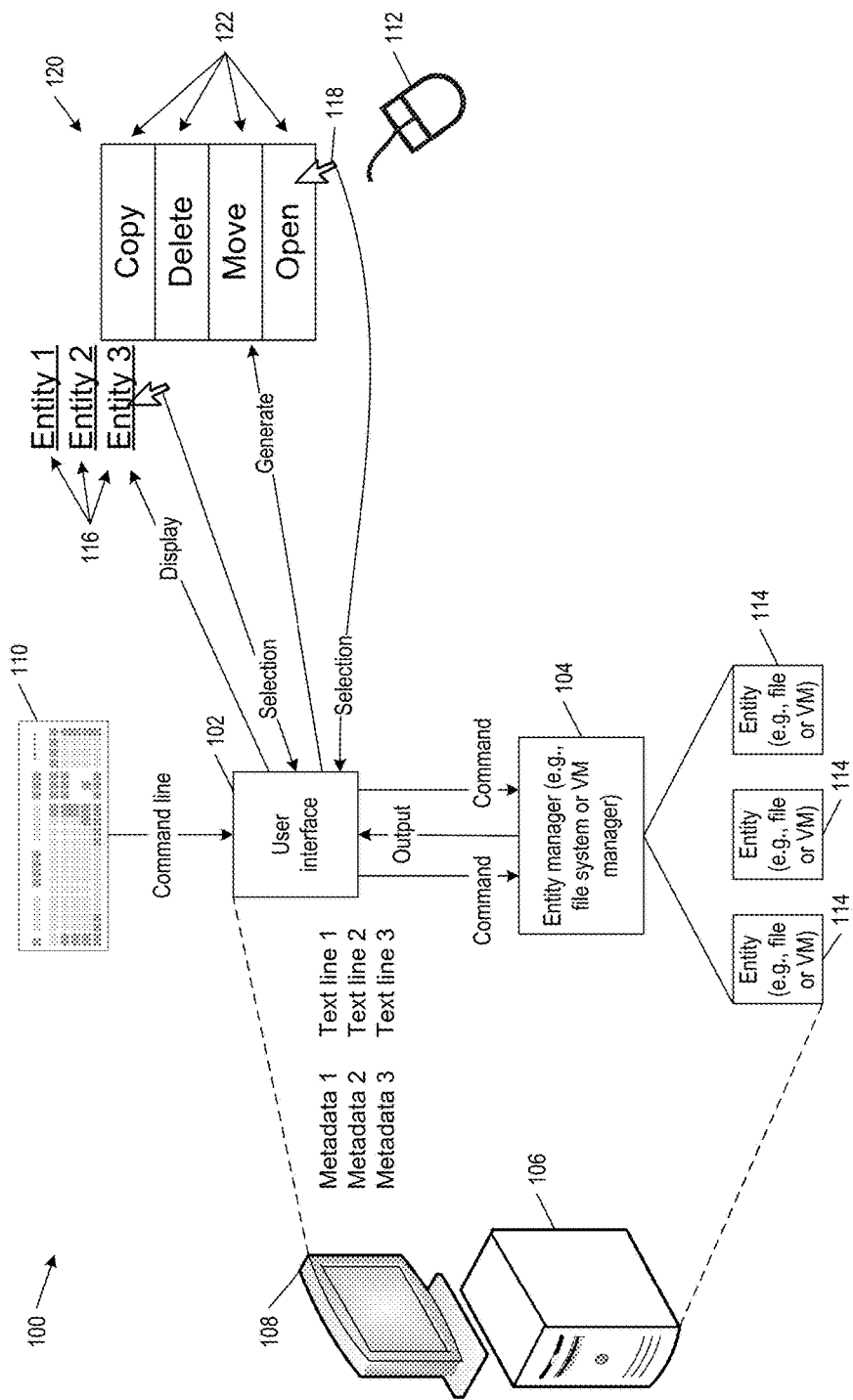
FIG. 1 is a block diagram illustrating a system that provides a user interface in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In complex software systems providing both a graphical user interface (GUI) and a command-line interface (CLI), the CLI is often "embedded" in the GUI. For example, although Windows "Command Prompt" and Linux "Terminal" applications appear to provide textual interaction, they are actually graphical windows in the GUI of the operating system (OS). However even when the CLI is part of the GUI, it is not possible to use the management capabilities of the GUI environment with the domain entities appearing in the textual output in the CLI from the execution of a textual command. This is because even though textual commands operate on domain entities (e.g., files or virtual machines) as inputs, such entities in their output are rendered as a plain unstructured text in the CLI. During this "conversion to textual representation" process, all context as to what domain entity certain text in the CLI represents is lost, which precludes the possibility of interacting with the text representing the entity as if it was the entity itself. For example, executing a "dir" command in Command Prompt or an "ls" command in Terminal lists all the files in a directory. However once the text representing the list of files is displayed, user interaction with it is limited to only non-specific text-related command like "copy text," "cut text," etc.

In accordance with the examples of the present disclosure, a mechanism is provided to allow semantic, contextual interaction with textual outputs of a CLI-like user interface. For example, a user interface may be a modified Command Prompt in Windows where the "dir" command still displays text lines representing files in a directory as usual but now the user has the ability to right-click with a mouse a text line containing the name of a file to bring up an Explore-like context menu containing file-specific actions such as "Copy, "Delete," "Send via email," and so forth, or alternatively click a text line to open a file.

FIG. 1 is a block diagram illustrating a system 100 that has a CLI-like user interface 102 to an entity manager 104 in examples of the present disclosure. Note user interface 102 also refers to the underlying program (also known as a "console" or "shell") that generates the interface. System 100 includes a computing device 106 with memory and processor, and a monitor 108, a keyboard 110, and a pointing device 112 coupled to the computing device. Although illustrated separately, monitor 108, keyboard 110, pointing device 112, or a combination thereof may be part of computing device 104. Computing device 106 may be a desktop computer, a laptop computer, or a tablet computer. Pointing device 112 may be a mouse, a trackpad, or a touchscreen that is part of monitor 108.

Computing system 106 executes entity manager 104 to manage entities 114 in a software system domain. Entity manager 104 may be a file system managing files, such as New Technology File System (NTFS) in Windows from Microsoft Corp. of Redmond, Wash., or the entity manager may be a virtual machine (VM) manger managing VM hosts and VMs, such as vCenter Server from VMware Inc. of Palo Alto, Calif. Computing system 106 executes user interface 102 and displays it on monitor 108. Using keyboard 110 and pointing device 112, a user provides input to user interface 102 to interact with entity manager 104.

User interface 102 is a CLI embedded in a GUI environment. User interface 102 displays a prompt, accepts a "command line" typed by the user, causes entity manger 104 to execute a command specified in the command line, and provides textual display of one or more results from the entity manager. The results may be entities 114, which are represented by text lines or text items 116 on monitor 108. User interface 102 makes text items 116 selectable with a cursor 118 controlled by keyboard 110 or pointing device 112. In response to the selection of an entity 116, user interface 102 generates an entity-specific contextual menu 120 with menu options 122 selectable by cursor 118. Menu options 122 are specific to the selected entity. In response to the selection of a menu option 122, user interface 102 causes entity manager 104 to execute the menu option on the selected entity.

Figure 2:
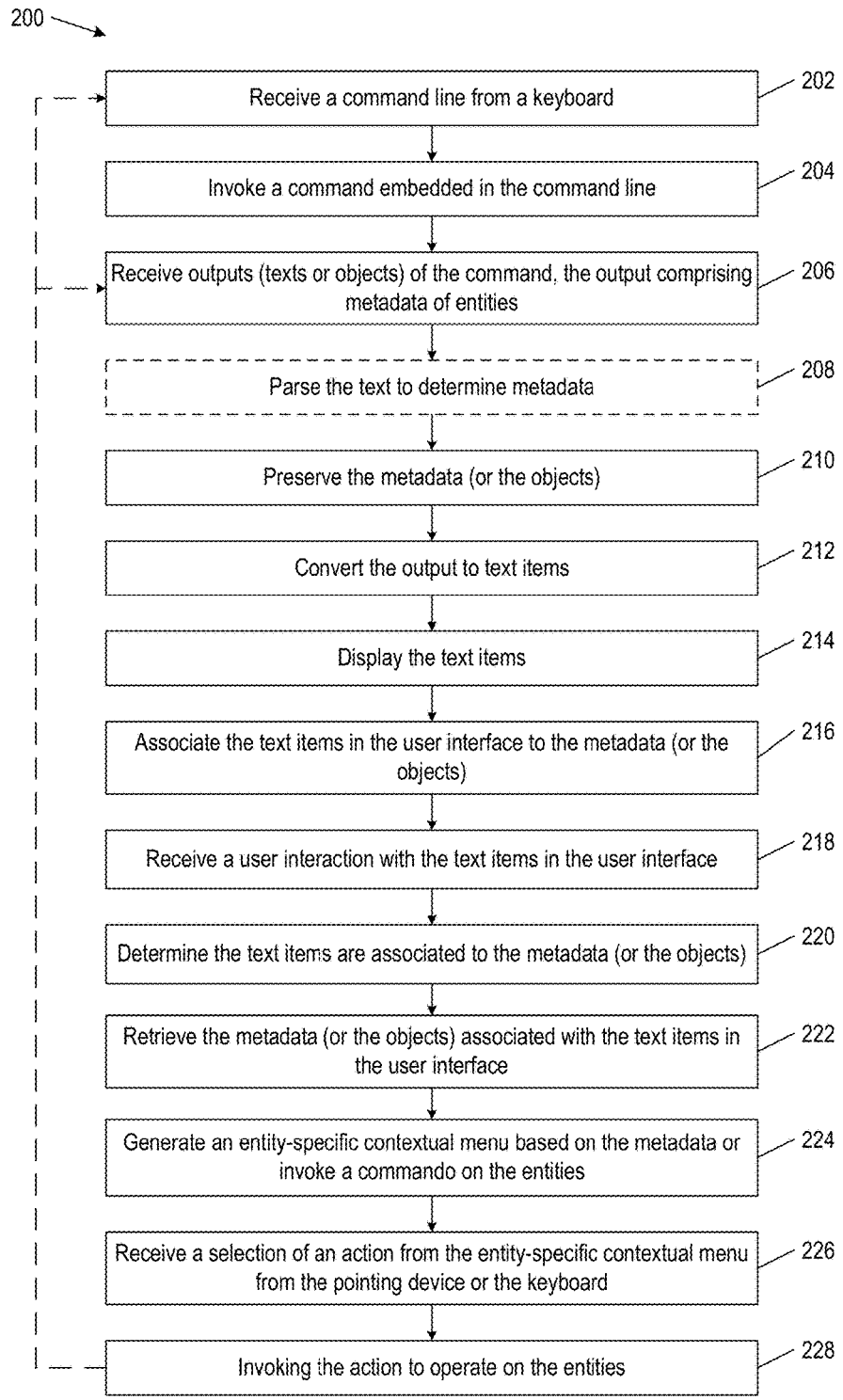
FIG. 2 is a flowchart of a method performed by user interface of FIG. 1 in examples of the present disclosures.

FIG. 2 is a flowchart of a method 200 performed by user interface 102 of FIG. 1 in the examples of the present disclosures. Method 200 may be executed by computing device 106 to provide user interface 102. Method 200 may begin with block 202.

In block 202, user interface 102 receives a command line from keyboard 110. The command line may be entered at a prompt. Block 202 may be followed by block 204.

In block 204, user interface 102 passes the command entered at the prompt (in block 202) for execution to the entity manager 104. In response, entity manager 104 executes the command and returns one or more outputs to user interface 102. For simplicity method 200 is explained hereafter assuming multiple outputs. The outputs may be in the form of text or software objects representing domain entities. When the outputs are text, metadata of the entities are to be extracted from the text as described later in block 208. When the outputs are objects, they already contain the metadata of the entities. Block 204 may be followed by block 206.

In block 206, user interface 102 receives the outputs of the command. Block 206 may be followed by optional block 208.

In block 208 when the outputs are text, user interface 102 parses the text, using command-specific built-in parsing rules describing the format of the textual output of the executed command, to determine the metadata of the entities. Block 208 may be followed by block 210.

In block 210, user interface 102 preserves the metadata of the entities. When the outputs are text, user interface 102 saves the metadata of the entities parsed in block 208. When the outputs are objects, user interface 102 directly saves the objects received in block 206. Block 210 may be followed by block 212.

In block 212, user interface 102 converts the outputs into text lines or items. When the outputs are text, user interface 102 uses the output text directly. When the outputs are objects, user interface 102 converts the objects to the text items using built-in or user-specified conversion rules. Block 212 may be followed by block 214.

In block 214, user interface 102 displays the text items. The text items may be selected with cursor 118 controlled by keyboard 110 or pointing device 112. User interface 102 may visually indicate that the text items are interactable, such as by underlining the text items. To detect user interaction, user interface 102 may monitor cursor location and input from keyboard 110 or pointing device 112 (e.g., a right or left click on a mouse). Block 214 may be followed by block 216.

In block 216, user interface 102 associates the displayed text items, for example by their screen locations or other means, to the corresponding metadata of the entities or the objects. User interface 102 may save the association as a table in memory. Block 216 may be followed by block 218.

In block 218, user interface 102 receives a user interaction for one or more of the text items from an input device (e.g., a mouse or a keyboard). User interface 102 allows user interaction with a single text item or multiple text items. For user interaction with a single text time, user interface 102 may receive a single or a double mouse click (e.g., a single or double left mouse click) of the text item. For user interaction with multiple text items, user interface 102 may receive a mouse selection of multiple text items and then a single or a double mouse click on the selection. Instead of mouse input, user interface 102 may receive keyboard input to navigate a console cursor to the one or more text items followed by a keyboard combination. For simplicity method 200 is explained hereafter assuming a selection of multiple text items. Block 218 may be followed by block 220.

In block 220, user interface 102 determines if the text items are associated to some of the preserved entity metadata. User interface 102 may determine the association by consulting the table created in block 216. Block 220 may be followed by block 222.

In block 222, user interface 102 retrieves the metadata, if they exist, of the entities associated with the text items. User interface 102 then uses the extracted metadata and the kind of received user interaction to determine the proper way of handling it, as described in the subsequent blocks. Block 222 may be followed by block 224.

In block 224, for certain types of user interaction (e.g. a right-mouse click), user interface 102 may generates an entity-specific contextual menu based on the metadata of the entities. The entity-specific contextual menu includes selectable menu options that can be applied to the selected entities. The menu options may be selected with cursor 118 controlled by keyboard 110 or pointing device 112. User interface 102 may generate the entity-specific contextual menu by creating it as a GUI object through a GUI subsystem of an OS or by drawing the entity-specific contextual menu and monitor cursor location and input from keyboard 110 or pointing device 112 (e.g., a right or left click on a mouse). Block 224 may be followed by block 226.

Alternatively in block 224, for certain types of user interaction (e.g. a left mouse click or a double click) user interface 102 may carry out a default action on the selected entities. For example, in response to a double mouse click on a file entity, user interface 102 causes a file manager 104 to open the files with the appropriate application.

In block 226, user interface 102 receives a selection of one of the menu options. Block 226 may be followed by block 228.

In block 228, user interface 102 invokes the menu option on the selected entity. In response, entity manager 104 executes the menu options on the selected entities. Entity manager 104 may return one or more outputs or error messages to user interface 102. If so block 228 may loop back block 206 to process the outputs or error messages as previously described. Otherwise block 228 may be followed by block 202 to receive another command.

Figure 3:
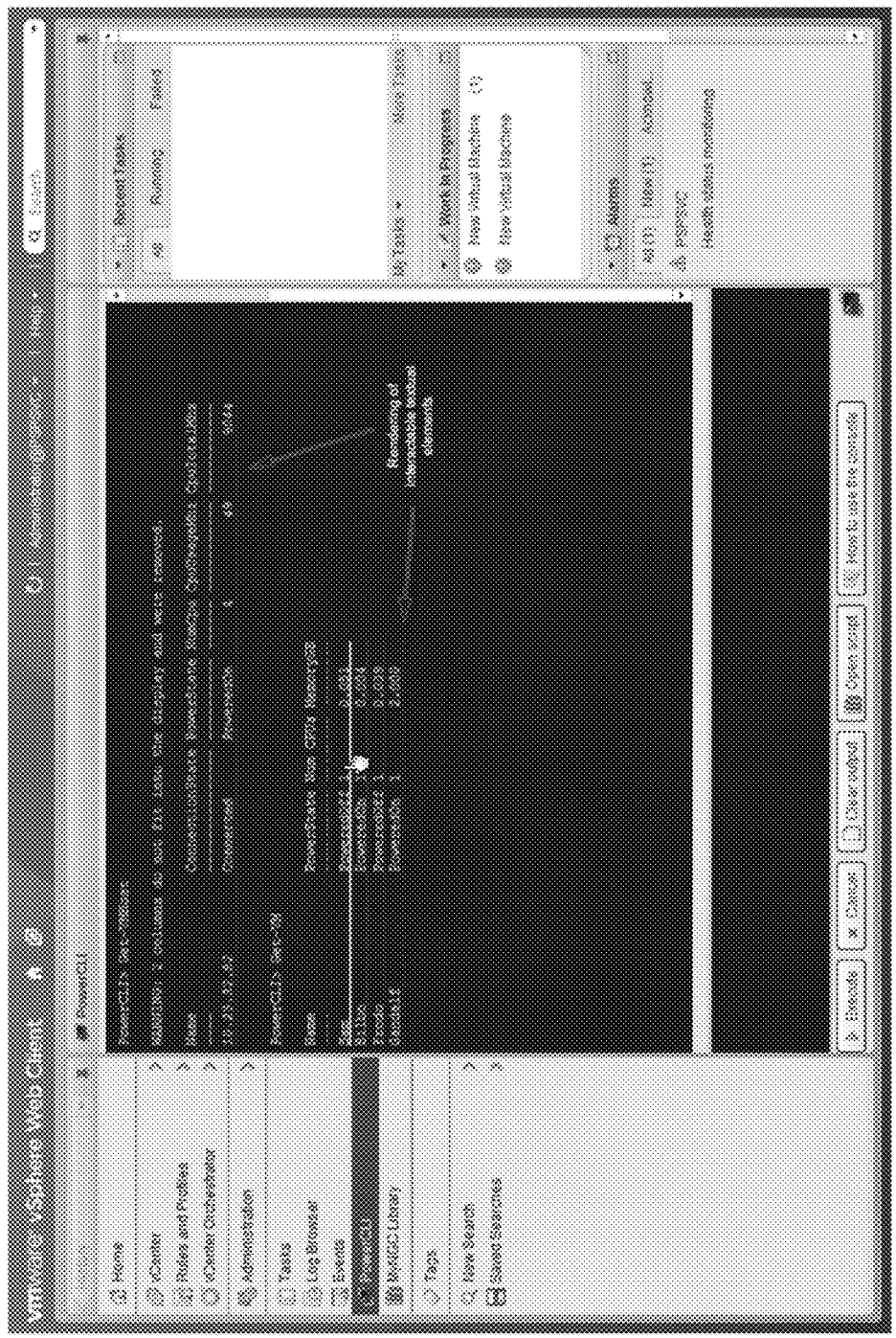
FIG. 3 is a screenshot of the user interface of FIG. 1 providing selectable textual elements in examples of the present disclosure.

FIG. 3 is a screenshot 300 of user interface 102 of FIG. 1 providing selectable textual elements in examples of the present disclosure. In these examples, user interface 102 interacts with a VM manager 104, such as a vCenter Server, which manages VMs in a system. Screenshot 300 shows a first prompt, in which a user entered a command line of "Get-VMHost" to retrieve hosts in the system. The result of the command line is displayed thereafter as a selectable text line or item that represent a VM host entity. The text item is underlined to indicate it is selectable. Screenshot 300 also shows a second prompt, in which the user entered a command line of "Get-VM" to retrieve VMs in the system. The result of the command line is displayed thereafter as successive selectable text lines or items that represent VM entities. The text items are underlined to indicate they are each selectable. Pointing device 112 may position a cursor over a text item and select it. The cursor is show located over a text item that represents the VM entity named "Sam."

Figure 4:
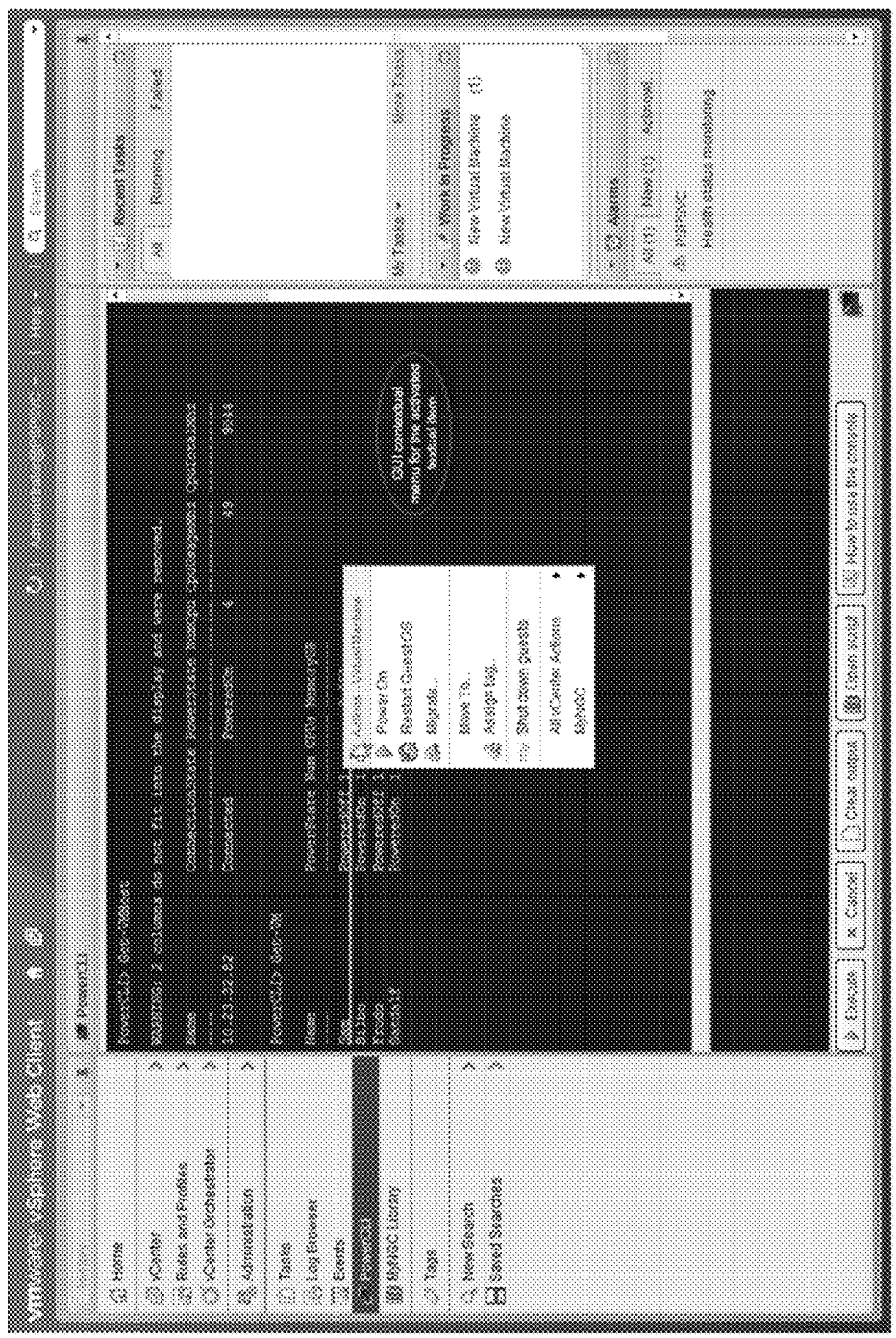
FIG. 4 is a screenshot of the user interface of FIG. 1 providing an entity-specific contextual menu in examples of the present disclosure.

FIG. 4 is a screenshot 400 of the user interface 102 of FIG. 3 providing an entity-specific contextual menu in examples of the present disclosure. Screenshot 400 shows the entity-specific contextual menu for the VM entity named "Sam" after the cursor selects that text item representing that VM entity. The entity-specific contextual menu has menu options that can be applied to the VM entity named "Sam." The menu options specific the VM entity named "Sam" includes powering on the VM, restarting a guest OS on the VM, migrating the VM, moving the VM, tagging the VM, shutting down guest OSs. Pointing device 112 may position the cursor over a menu option and select it.

From the foregoing, it will be appreciated that various embodiments of the present disclosure have been described herein for purposes of illustration, and that various modifications may be made without departing from the scope and spirit of the present disclosure. For example, user interface 102 may interact with other types of entity managers. Accordingly, the various embodiments disclosed herein are not intended to be limiting, with the true scope and spirit being indicated by the following claims.

We claim:

1. A method for a processor to provide a user interface to manage entities in a software system domain, comprising:
   receiving a command line from an input device;
   in response to the command line:
      invoking a command embedded in the command line;
      receiving an output of the command, the output including metadata of an entity in the software system domain;
      in response to the output comprising an object that represents the entity in the software system domain, retrieving the metadata of the entity from the object;
      in response to the output comprising text that represents the entity in the software system domain, parsing the text to determine the metadata of the entity;
      preserving the metadata;
      converting the output to a text item;
      displaying the text item at a screen location of a display; and
      associating the text item, the metadata, and the screen location of the display;
   receiving a user interaction for the text item associated with the screen location of the display from the input device; and
   in response to the user interaction for the text item:
      retrieving the metadata associated with the text item; and
      executing an entity-specific action based on the metadata associated with the text item representing the entity.

2. The method of claim 1, wherein:
   the input device comprises a mouse or a keyboard; and
   the user interaction with the text item in the user interface comprises clicking on the text item in the user interface with the mouse or navigating a console cursor to the text item and pressing a keyboard combination.

3. The method of claim 1, wherein:
   in response to the output comprising an object that represents the entity in the software system domain,
   preserving the metadata comprises saving the object;
   converting the output to the text item comprises converting the object to textual representation;
   associating the text item to the metadata comprises associating the text item in the use interface to the object;
   retrieving the metadata associated with the text item comprises determining the object the text item in the user interface is associated to; and
   the entity-specific action comprises generating a contextual menu with actions that are operable on the entity or directly executing a default entity-specific command.

4. The method of claim 1, wherein:
   in response to the output comprising text that represents the entity in the software system domain,
   the method further comprises, after receiving the output of the command and before preserving the metadata, parsing the text to determine the metadata;
   preserving the metadata comprises saving the parsed metadata;
   associating the text item to the metadata comprises associating the text item in the use interface to the parsed metadata;
   retrieving the metadata associated with the text item comprises determining the parsed metadata the text item in the user interface is associated with; and
   the entity-specific action comprises generating a contextual menu with actions that are operable on the entity in the software system domain or directly executing a default entity-specific command.

5. The method of claim 1, wherein displaying the text item further comprises rendering the text item with a visual indication that the text item is interactable with the input device.

6. The method of claim 1, wherein the entities are files and the software system domain is a file system, or the entities are virtual machines and the software system domain is a virtual machine host.

7. A non-transitory computer-readable storage medium encoded with instructions executable by a processor to:
   receive a command line from an input device;
   in response to the command line:
      invoke a command embedded in the command line;
      receive an output of the command, the output including metadata of an entity in a software system domain;
      in response to the output comprising an object that represents the entity in the software system domain, retrieve the metadata of the entity from the object;
      in response to the output comprising text that represents the entity in the software system domain, parse the text to determine the metadata of the entity;
      preserve the metadata;
      convert the output to a text item;
      display the text item at a screen location of a display; and
      associate the text item, the metadata, and the screen location of the display;
   receive a user interaction for the text item associated with the screen location of the display from the input device; and
   in response to the user interaction for the text item:
      retrieve the metadata associated with the text item; and
      execute an entity-specific action based on the metadata associated with the text item representing the entity.

8. The storage medium encoded of claim 7, wherein:
   the input device comprises a mouse or a keyboard; and
   the user interaction with the text item in the user interface comprises clicking on the text item in the user interface with the mouse or navigating a console cursor to the text item and pressing a keyboard combination.

9. The storage medium encoded of claim 7, wherein:
   in response to the output comprising an object that represents the entity in the software system domain,
   preserve the metadata comprises saving the object;
   convert the output to the text item comprises converting the object to textual representation;
   associate the text item to the metadata comprises associating the text item in the use interface to the object;
   retrieve the metadata associated with the text item comprises determining the object the text item in the user interface is associated to; and
   the entity-specific action comprises generating a contextual menu with actions that are operable on the entity or directly executing a default entity-specific command.

10. The storage medium encoded of claim 7, wherein:
    in response to the output comprising text that represents the entity in the software system domain,
    the instructions further comprises, after receiving the output of the command and before preserving the metadata, parse the text to determine the metadata;
    preserve the metadata comprises saving the parsed metadata;
    associate the text item to the metadata comprises associating the text item in the use interface to the parsed metadata;

retrieve the metadata associated with the text item comprises determining the parsed metadata the text item in the user interface is associated with; and the entity-specific action comprises generating a contextual menu with actions that are operable on the entity in the software system domain or directly executing a default entity-specific command.

11. The storage medium encoded of claim 7, wherein display the text item further comprises rendering the text item with a visual indication that the text item is interactable with the input device.

12. The storage medium encoded of claim 7, wherein the entities are files and the software system domain is a file system, or the entities are virtual machines and the software system domain is a virtual machine host.

* * * * *